C. AMBRETTE.
KNEADING MACHINE.
APPLICATION FILED APR. 3, 1911.
1,006,710.
Patented Oct. 24, 1911.
2 SHEETS—SHEET 2.
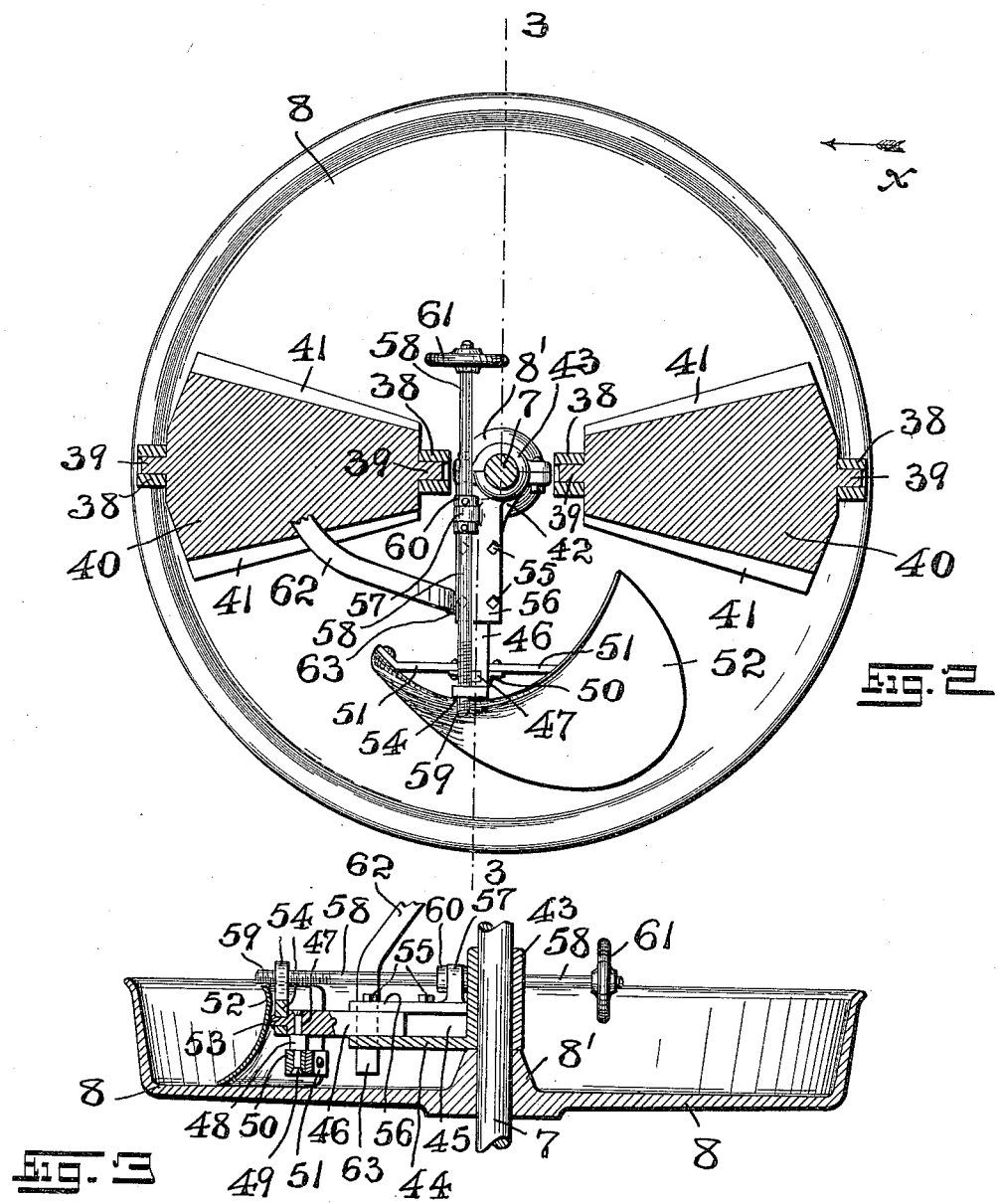
WITNESSES:
Fredk W. Fraentzel
Harry E. Pfeiffer
INVENTOR:
Conrad Ambrette,
BY
Fraentzel and Richards,
ATTORNEYS

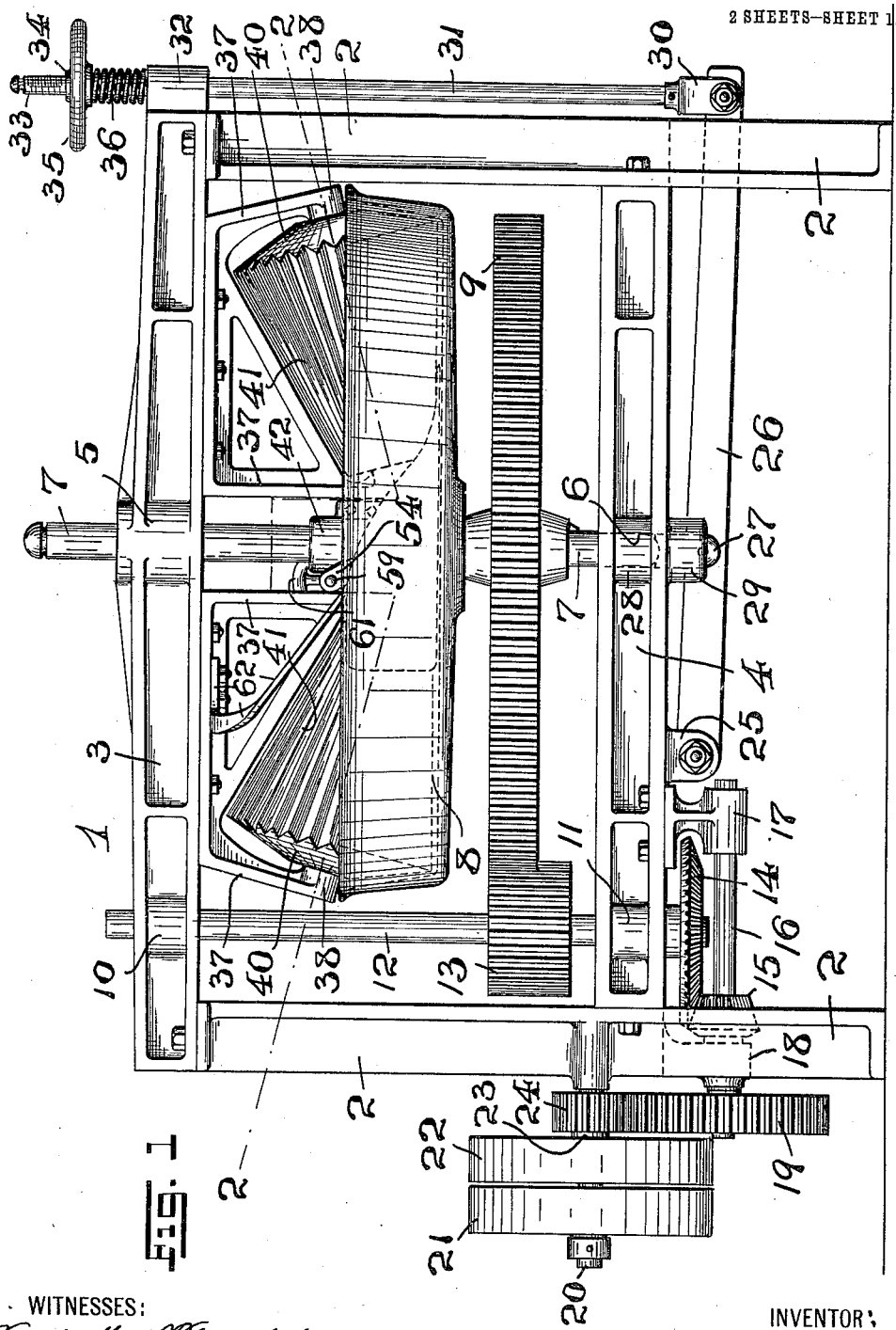

UNITED STATES PATENT OFFICE.

CONRAD AMBRETTE, OF NEW YORK, N. Y., ASSIGNOR TO CEVASCO, CAVAGNARO & AMBRETTE, OF NEW YORK, N. Y., A FIRM.

KNEADING-MACHINE.

1,006,710.　　　　　Specification of Letters Patent.　　Patented Oct. 24, 1911.

Application filed April 3, 1911. Serial No. 618,566.

*To all whom it may concern:*

Be it known that I, CONRAD AMBRETTE, a subject of the King of Italy, residing at New York, in the county of New York and State of New York, have invented certain new and useful Improvements in Kneading-Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in kneading machines; and, the present invention relates, more particularly, to a novel and simply constructed power-driven kneading machine for kneading and working up the dough used in the preparation and manufacture of macaroni, vermicelli, noodles, and other alimentary pastes.

The present invention has for its principal object to provide a kneading machine having a revolving pan or trough, operating in conjunction with corrugated and conically formed kneading rolls, the said pan or trough being adjustable with relation to said kneading rolls, so as to accommodate a greater or less quantity of dough.

A further object of this invention is to provide a novel construction of dough-overturning device which is adjustable in its arrangement within said pan or trough, so that the same will operate properly in accordance with the amount of dough submitted to the kneading operation of the machine, the said dough-overturning device being further constructed and arranged so that the same will move with the pan or trough when the latter is adjusted with relation to said kneading rolls, and will therefore always be maintained in proper position and proper registration with the bottom of the pan or trough, no matter what position the latter assumes when the same is raised or lowered in the course of its adjustment.

With the various objects of the present invention in view, the said invention consists, primarily, in the general arrangements and combinations of the various devices and parts, as well as in the details of the construction of the same, all of which will be hereinafter more fully set forth, and then finally embodied in the clauses of the claims which are appended to and which form an essential part of this specification.

The invention is clearly illustrated in the accompanying drawings, in which:—

Figure 1 is a front elevation of the novel construction of kneading-machine, the same being made according to and embodying the principles of the present invention; Fig. 2 is a detail horizontal section of the same, said section being taken on line 2—2 in said Fig. 1; and Fig. 3 is a transverse vertical section, taken on line 3—3 in said Fig. 2, looking in the direction of the arrow $x$.

Similar characters of reference are employed in all of the above described views, to indicate corresponding parts.

Referring now to the several figures of the drawings, the reference-character 1 indicates one form of complete kneading machine made according to and embodying the principles of the present invention, the same comprising a suitable frame-work consisting of the standards 2, the upper cross-beam 3, and the lower cross-beam 4. The said upper and lower cross-beams 3 and 4 are respectively provided with suitable bearings 5 and 6 in which is journaled a vertical shaft 7. Secured upon said vertical shaft 7, so as to revolve therewith, is a pan or trough 8, the same being circular in form, and secured further upon said vertical shaft 7, below said pan or trough 8, in any suitable manner, is a gear-wheel 9. The said upper and lower cross-beams 3 and 4 are further provided, adjacent to one of their ends, with the respective bearings 10 and 11 in which is journaled a driving shaft 12. Secured upon said driving shaft 12, in any suitable manner, is a large pinion 13, which is in mesh with the said gear-wheel 9, whereby the latter is driven to revolve said vertical shaft 7 and said pan or trough 8 mounted thereon. Suitably secured upon the lower end of the said driving shaft 12 is a bevel-gear 14, said bevel-gear 14 being in mesh with a bevel-pinion 15 which is secured upon a counter-shaft 16, journaled in bearing-elements 17 and 18, which are suitably secured, respectively, to said lower cross-beam 4 and one of said standards 2. The said counter-shaft 16 has also suitably secured upon the outer end thereof a gear-wheel 19. One of said standards 2 is provided with an outwardly extending spindle 20 upon which is suitably mounted, so as to rotate freely thereon, a pair of pulley-wheels 21 and 22, the said pulley-wheel 22 being provided with a hub-portion 23 upon which is secured a pinion 24, which is in mesh with the said gear-wheel 19, so that, when power is transmitted to said pulley-wheel 22, the same may be caused to drive the said counter-shaft 16, the power being finally transmitted to said vertical shaft 7 and the pan or trough 8; and, whereby, by means of the mechanism above described, the same is revolved, as will be clearly evident. Connected with the under side of said lower cross-beam 4 are perforated ears or lugs 25 between which is pivotally arranged the one end of an adjusting lever 26. Pivotally mounted upon said adjusting lever 26, in suitable location, is a suitable thrust bearing-block 27 upon which rests the foot 28 of said vertical shaft 7, said bearing block 27 being maintained in its proper relation with said vertical shaft 7, by means of a pair of guide-lugs 29 which are connected with the under-side of said lower cross-beam 4. Pivotally connected with the free end of said adjusting lever 26 is the forked end 30 of an upwardly extending rod 31, the latter passing through a suitable bracket-bearing 32 which is connected with said frame-work. The upper or free end of said rod 31 is made with screw-threads 33 upon which is arranged the nut-like hub 34 of a hand-wheel 35, and encircling the said rod 31, between said hand-wheel 35 and said bracket-bearing 32, is a coiled spring 36. Secured in a suitable manner to the under side of the said upper cross-beam 3 are a pair of bracket-elements 37, the arms of which are provided, at their free ends, with bearing-portions 38 in which are mounted the journals 39 of conically formed kneading rolls 40, each kneading roll 40 being provided on its face with longitudinally extending corrugations, as 41. The said kneading rolls 40 are free to revolve in the said bearing-portions 38, and the same are mounted in such a manner that their conical surfaces are in alinement and register with the bottom of the previously mentioned pan or trough 8. Mounted loosely upon the said vertical shaft 7, by means of a yoke-portion 42 and its cap-piece 43, is a bracket-arm 44, which is provided with a channel or receiving groove 45, said bracket-arm 44 and its yoke-portion 42 being supported above the hub 8' of said pan or trough 8, and extending within the said pan or trough 8, toward the outer walls thereof. Slidably arranged within said channel or receiving groove 45 of said bracket-arm 44 is a carrier-arm 46, and suitably secured to the outer free end of said carrier-arm 46, by means of its rivet-shank 47, is a downwardly depending lug 48, provided at its lower end in another rivet-shank 49 which is secured in the bracket-block 50, which in turn is secured to a brace 51, said brace 51 carrying thereon a turn-over plate 52. The outer free end of said carrier-arm 46 is further provided with an outwardly extending rivet-shank 53, which serves to secure in operative connection with said carrier-arm 46 an upwardly extending nut-piece 54.

Secured to said bracket-arm 44, by means of the bolts 55, or the like, is a cover-plate 56 which extends over said channel or receiving groove 45 and said carrier arm 46 arranged therein. Connected with said cover-plate 56 and extending upwardly therefrom is a bearing-member 57 in which is journaled the shank of an adjusting screw 58, the screw-threaded end 59 of which engages the said nut-piece 54 connecting with the end of said carrier-arm 46, and arranged upon said shank 58, upon either side of said bearing member 57, are suitable collars 60 which prevent any longitudinal movement of said shank 58 in said bearing-member 57. Suitably mounted upon said shank 58 is a hand-wheel 61 for operating said adjusting screw.

Connected by means of bolts or other desirable fastening means to a convenient part of the frame-work of the machine, is a stop-bracket 62, the same being bent downwardly and having at its free end a vertical stop-piece 63, against which said bracket-arm 44 is brought to rest, said bracket-arm 44 being capable of sliding freely in a vertical plane against said stop-piece 63, when the pan or trough 8 and the herein-above mentioned turn-over device are adjusted with respect to their relation with the kneading-rolls.

In its operation, the pan or trough 8 is caused to revolve beneath the corrugated kneading-rolls 40. The dough to be kneaded is placed in the pan or trough 8, which carries the same beneath the kneading rolls, which, being free to revolve, roll upon the dough with a pulling and kneading action. The turn-over plate 52 having been properly adjusted, picks up the dough from the bottom of the pan or trough 8, and owing to its peculiar plowshare-like conformation, throws over or overturns the dough, so that all parts of the same are presented to the action of the kneading rolls and thoroughly worked and kneaded to produce a homogeneous mass. When working a small quantity of dough, it is desirable to have the pan or trough 8 quite close to the kneading rolls 40 and the turn-over plate 52 near to the circumferential wall of said pan or trough, but when working large quantities of dough, the pan or trough 8 must be lowered to adjust the same with relation to the kneading rolls 40 so that the dough will not crowd the rolls too much. To adjust the pan or trough 8 for this purpose, the hand-wheel 35 is turned to operate its nut-like hub 34 upon the screw-threads 33 of the rod 31, so as to lower the same and the adjusting lever 26, which permits the vertical shaft 7 to move downwardly in its bearings and thereby carries the pan or trough away from the kneading-rolls 40 to the desired distance, as will be clearly evident. The yoke-piece 42 of said bracket arm 44 being loosely mounted on said shaft 7, when the pan or trough 8 is lowered, the said bracket-arm 44 will follow the same, so that the turn-over device will move downwardly with said pan or trough and will always maintain said turn-over plate in its proper relation with the bottom of said pan or trough. It is also desirable, when working large quantities of dough, to adjust the position of said turn-over plate 52, that is to move said turn-over plate farther away from the circumferential wall of said pan or trough, so that the larger quantity of dough will pass over said plate and be operated upon to overturn the same. To accomplish this result, the adjusting screw 58 is turned by said hand-wheel 61, to cause its screw-threaded end 59 to operate in said nut-piece 54, whereby said carrier-arm 46 may be moved in the channel or receiving groove 45 of said bracket-arm 44, and whereby said turn-over plate 52, which is connected with the end of said carrier-arm 46, is also moved to its desired adjusted position. The stop-piece 63 engages said bracket-arm 44 and prevents the shaft 7, as it revolves from acting upon the yoke-portion 42 of said bracket-arm 44 to turn said bracket arm and the parts connected therewith.

I am fully aware that some changes may be made in the general arrangements and combinations of the several devices and parts of the kneading machine, as well as in the details of the construction of said parts, without departing from the scope of my present invention, as set forth in the foregoing specification, and as defined in the claims which are appended thereto. Hence, I do not limit my invention to the exact arrangements and combinations of the devices and parts as herein described, and as illustrated in the accompanying drawings, nor do I confine myself to the exact details of the construction of the said parts.

I claim:—

1. In a kneading machine, the combination with a frame-work, of a pair of conical corrugated kneading rolls, a vertical shaft journaled in said frame-work, a pan or trough secured upon said vertical shaft and registering beneath said kneading rolls, means for revolving said vertical shaft and said pan or trough, means for adjusting said pan or trough vertically with relation to said kneading rolls, comprising an adjusting lever pivotally connected with said frame-work, a thrust-bearing block mounted upon said adjusting lever and adapted to support said vertical shaft, and a rod slidably connected with said frame-work and pivotally connected at one end with said adjusting lever, screw-threads upon the free end of said rod, and an adjustable turn-over device arranged within said pan or trough and adapted to follow the vertical movements of said pan or trough, substantially as and for the purposes set forth.

2. In a kneading machine, the combination with a frame-work, of a pair of conical corrugated kneading rolls, a vertical shaft journaled in said frame-work, a pan or trough secured upon said vertical shaft and registering beneath said kneading rolls, means for revolving said vertical shaft and said pan or trough, means for adjusting said pan or trough vertically with relation to said kneading rolls, and an adjustable turn-over device arranged within said pan or trough and adapted to follow the vertical movements of said pan or trough, said turn-over device comprising a bracket-arm loosely mounted upon said vertical shaft, a carrier-arm slidably supported by said bracket-arm, a turn-over plate, means for supporting said turn-over plate in connection with said carrier-arm, a cover-plate secured upon said bracket-arm, a bearing-member connected with said cover-plate, an adjusting screw journaled in said bearing-member, a nut-piece connected with the outer end of said carrier-arm and operatively connected with the screw-threads of said adjusting-screw, a hand-wheel upon the free end of said adjusting screw, a bracket-member connected with said frame-work, and a stop-piece carried by said bracket-member adapted to contact with the side of said bracket-arm, substantially as and for the purposes set forth.

3. In a kneading machine, the combination with a vertical shaft, of a pan or trough adapted to revolve with said shaft, a pair of kneading rolls arranged above said pan or trough, means for adjusting said pan or trough vertically with relation to said kneading rolls, an adjustable turn-over device arranged within said pan or trough and adapted to follow the vertical movements of said pan or trough, the same comprising a bracket-arm loosely mounted upon said vertical shaft, a carrier-arm slidably supported by said bracket-arm, a turn-over plate, means for supporting said turn-over plate in connection with said carrier-arm, and means for moving said carrier-arm to adjust the position of said turn-over plate within the pan or trough, substantially as and for the purposes set forth.

4. In a kneading-machine, the combination with a vertical shaft, of a pan or trough adapted to revolve with said shaft, a pair of kneading rolls arranged above said pan or trough, means for adjusting said pan or trough vertically with relation to said kneading rolls, an adjustable turn-over device arranged within said pan or trough and adapted to follow the vertical movements of said pan or trough, the same comprising a bracket-arm loosely mounted upon said vertical shaft, a carrier-arm slidably supported by said bracket-arm, a turn-over plate, means for supporting said turn-over plate in connection with said carrier-arm, and means for moving said carrier-arm to adjust the position of said turn-over plate within the pan or trough, and a stop-piece for preventing the rotation of said bracket-arm with said vertical shaft, substantially as and for the purposes set forth.

5. In a kneading machine, the combination with a vertical shaft, of a pan or trough adapted to revolve with said shaft, a pair of corrugated kneading rolls arranged above said pan or trough, means for adjusting said pan or trough vertically with relation to said kneading-rolls, an adjustable turn-over device arranged within said pan or trough and adapted to follow the vertical movements of said pan or trough, the same comprising a bracket-arm loosely mounted upon said vertical shaft, a carrier-arm slidably supported by said bracket-arm, a turn-over plate, means for supporting said turn-over plate in connection with said carrier-arm, a cover-plate secured upon said bracket-arm, a bearing member connected with said cover-plate, an adjusting screw journaled in said bearing-member, a nut-piece connected with the outer end of said carrier-arm and operatively connected with the screw-threads of said adjusting screw, and a hand-wheel for operating said adjusting screw to adjust the position of said turn-over plate within said pan or trough, substantially as and for the purposes set forth.

6. In a kneading-machine, the combination with a vertical shaft, of a pan or trough adapted to revolve with said shaft, a pair of corrugated kneading rolls arranged above said pan or trough, means for adjusting said pan or trough vertically with relation to said kneading-rolls, an adjustable turn-over device arranged within said pan or trough and adapted to follow the vertical movements of said pan or trough, the same comprising a bracket-arm loosely mounted upon said vertical shaft, a carrier-arm slidably supported by said bracket-arm, a turn-over plate, means for supporting said turn-over plate in connection with said carrier-arm, a cover-plate secured upon said bracket-arm, a bearing-member connected with said cover-plate, an adjusting screw journaled in said bearing-member, a nut-piece connected with the outer end of said carrier-arm and operatively connected with the screw-threads of said adjusting screw, a hand-wheel for operating said adjusting screw to adjust the position of said turn-over plate within said pan or trough, and a stop-piece for preventing the rotation of said bracket-arm with said vertical shaft, substantially as and for the purposes set forth.

In testimony that I claim the invention set forth above I have hereunto set my hand this 29th day of March, 1911.

CONRAD AMBRETTE.

Witnesses:
GEORGE D. RICHARDS,
ADOLPH HANSEN.

Copies of this patent may be obtained for five cents each, by addressing the "Commissioner of Patents, Washington, D. C."